United States Patent
Kobayashi et al.

(10) Patent No.: US 10,615,956 B2
(45) Date of Patent: Apr. 7, 2020

(54) CLOCK AND DATA RECOVERY DEVICE AND PHASE DETECTION METHOD

(71) Applicant: TOSHIBA MEMORY CORPORATION, Tokyo (JP)

(72) Inventors: Hiroyuki Kobayashi, Kanagawa (JP); Yutaka Shimizu, Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 0 days.

(21) Appl. No.: 16/118,409

(22) Filed: Aug. 30, 2018

(65) Prior Publication Data

US 2019/0288831 A1    Sep. 19, 2019

(30) Foreign Application Priority Data

Mar. 19, 2018   (JP) .................. 2018-051398

(51) Int. Cl.
*H04L 7/04*     (2006.01)
*H04L 27/36*    (2006.01)

(52) U.S. Cl.
CPC .............. *H04L 7/04* (2013.01); *H04L 27/36* (2013.01)

(58) Field of Classification Search
CPC ......... H03K 7/02; H03L 7/00; H04L 25/4917; H04L 7/0025; H04L 7/0087; H04L 7/0337

See application file for complete search history.

(56) References Cited

U.S. PATENT DOCUMENTS

| | | | |
|---|---|---|---|
| 8,284,887 B2 | 10/2012 | Kikuchi et al. | |
| 9,077,593 B2 | 7/2015 | Chaivipas | |
| 2004/0141567 A1* | 7/2004 | Yang | H03L 7/087 375/287 |
| 2007/0253475 A1* | 11/2007 | Palmer | H04L 7/041 375/229 |
| 2012/0224407 A1* | 9/2012 | Aleksic | H03L 7/24 365/129 |
| 2015/0117579 A1 | 4/2015 | Shibasaki | |
| 2015/0180642 A1 | 6/2015 | Hsieh et al. | |
| 2016/0056980 A1* | 2/2016 | Wang | H04L 25/03057 375/233 |
| 2017/0033918 A1* | 2/2017 | Hossain | H04L 7/0087 |

FOREIGN PATENT DOCUMENTS

WO    2012/029597 A1    3/2012
WO    2017/175365 A1    10/2017

* cited by examiner

Primary Examiner — Khanh C Tran
(74) Attorney, Agent, or Firm — Kim & Stewart LLP

(57) ABSTRACT

A clock and data recovery device includes an extraction circuit and a phase detection circuit. The extraction circuit extracts transition information including data information corresponding to a value of data and edge information corresponding to transition of the value of the data, from a multivalued input data signal subjected to pulse amplitude modulation in synchronization with a clock from an oscillator. The phase detection circuit uses transition information selected based on a predetermined condition, when executing a phase error determination of the clock with respect to the input data signal based on the transition information extracted by the extraction circuit.

16 Claims, 9 Drawing Sheets

| D-H | D-C | D-L | AMP | POL |
|-----|-----|-----|-----|-----|
| 0 | 0 | 0 | 1 | 0 |
| 0 | 0 | 1 | 0 | 0 |
| 0 | 1 | 1 | 0 | 1 |
| 1 | 1 | 1 | 1 | 1 |

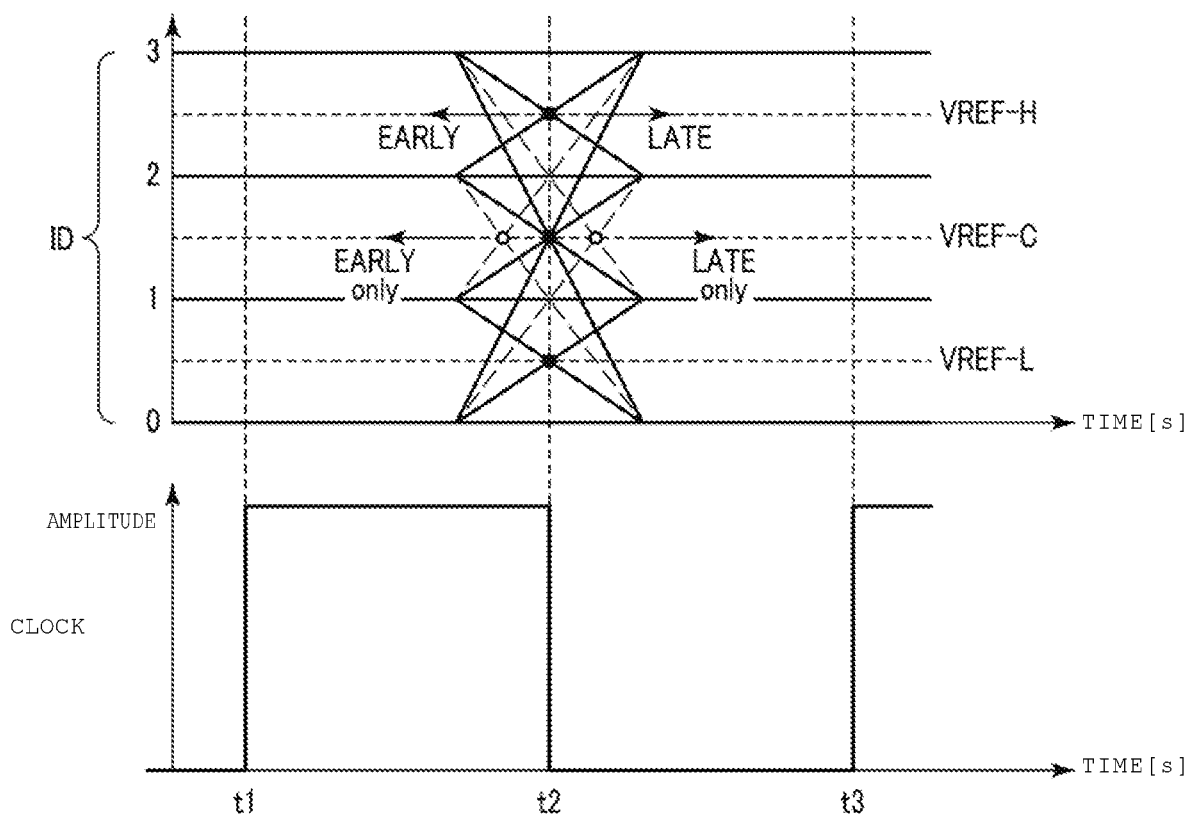

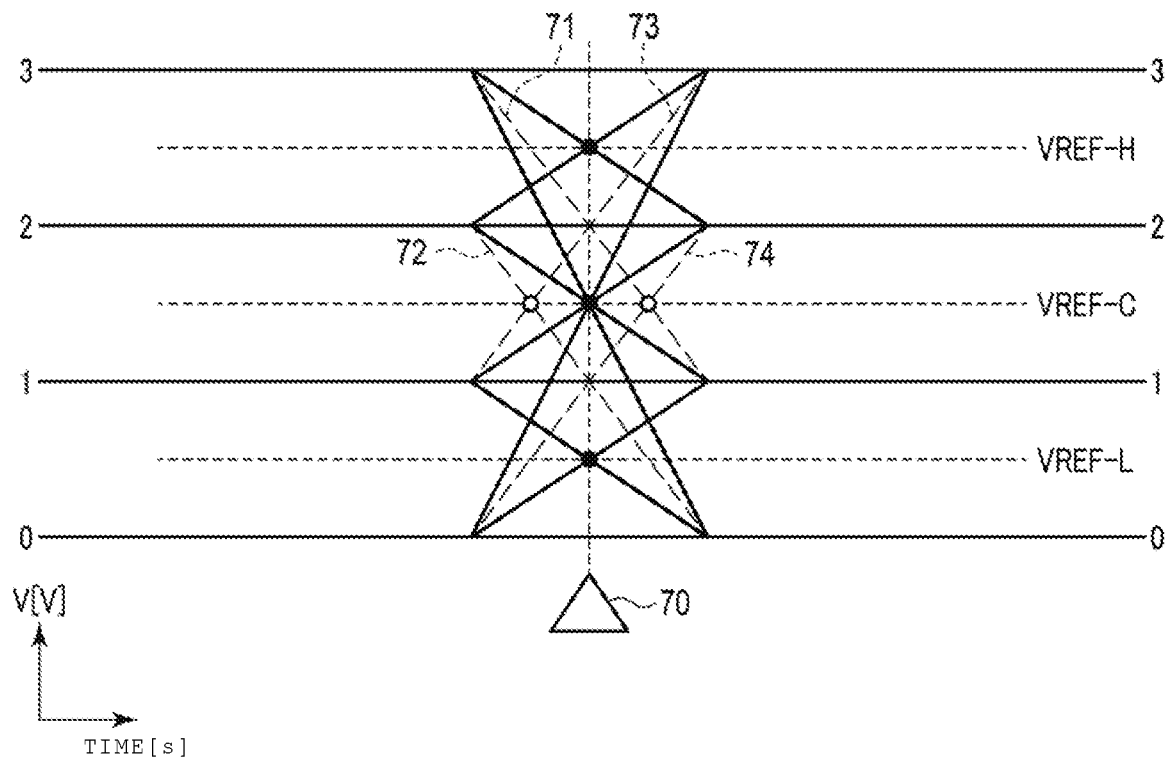

CLOCK AND DATA RECOVERY DEVICE AND PHASE DETECTION METHOD

CROSS-REFERENCE TO RELATED APPLICATIONS

This application is based upon and claims the benefit of priority from. Japanese Patent Application No. 2018-051398, filed Mar. 19, 2018, the entire contents of which are incorporated herein by reference.

FIELD

Embodiments described herein relate generally to a clock and data recovery device and a phase detection method.

BACKGROUND

In recent years, for example, in a memory system, a local area network (LAN) or the like, multivalued PAM-X data (X-ary value) subjected to pulse-amplitude modulation (PAM) is used as data to be serially transmitted. Generally, for example, PAM-4 data of 2-bit (4-ary value) pulse amplitude modulation type is often used.

In a reception circuit or the like which receives serially transmitted PAM-4 data as input data, a clock and data recovery device, which separates and recovers a clock superimposed on a data signal of input data and the PAM-4 data, is used. Hereinafter, the clock and data recovery device may be referred to as a CDR device.

DESCRIPTION OF THE DRAWINGS

FIG. 6 is a diagram illustrating timing between data and clock in a data/edge sampler according to the second embodiment.

FIG. 7 is a diagram for explaining characteristics of data signal transition of PAM-4 data according to the second embodiment.

FIG. 8 is a diagram illustrating a determination result of a phase error of a phase detector according to the second embodiment.

DETAILED DESCRIPTION

Embodiments provide a CDR device of a type using a phase detector, that is able to realize a stable operation.

In general, according to an embodiment, a clock and data recovery device includes an extraction circuit and a phase detection circuit. The extraction circuit extracts transition information including data information corresponding to a value of data and edge information corresponding to transition of the value of the data, from a multivalued input data signal subjected to pulse amplitude modulation in synchronization with a clock from an oscillator. The phase detection circuit uses transition information selected based on a predetermined condition, when executing a phase error determination of the clock with respect to the input data signal based on the transition information extracted by the extraction circuit.

Hereinafter, embodiments will be described with reference to the drawings.

First Embodiment

Figures 1, 2:
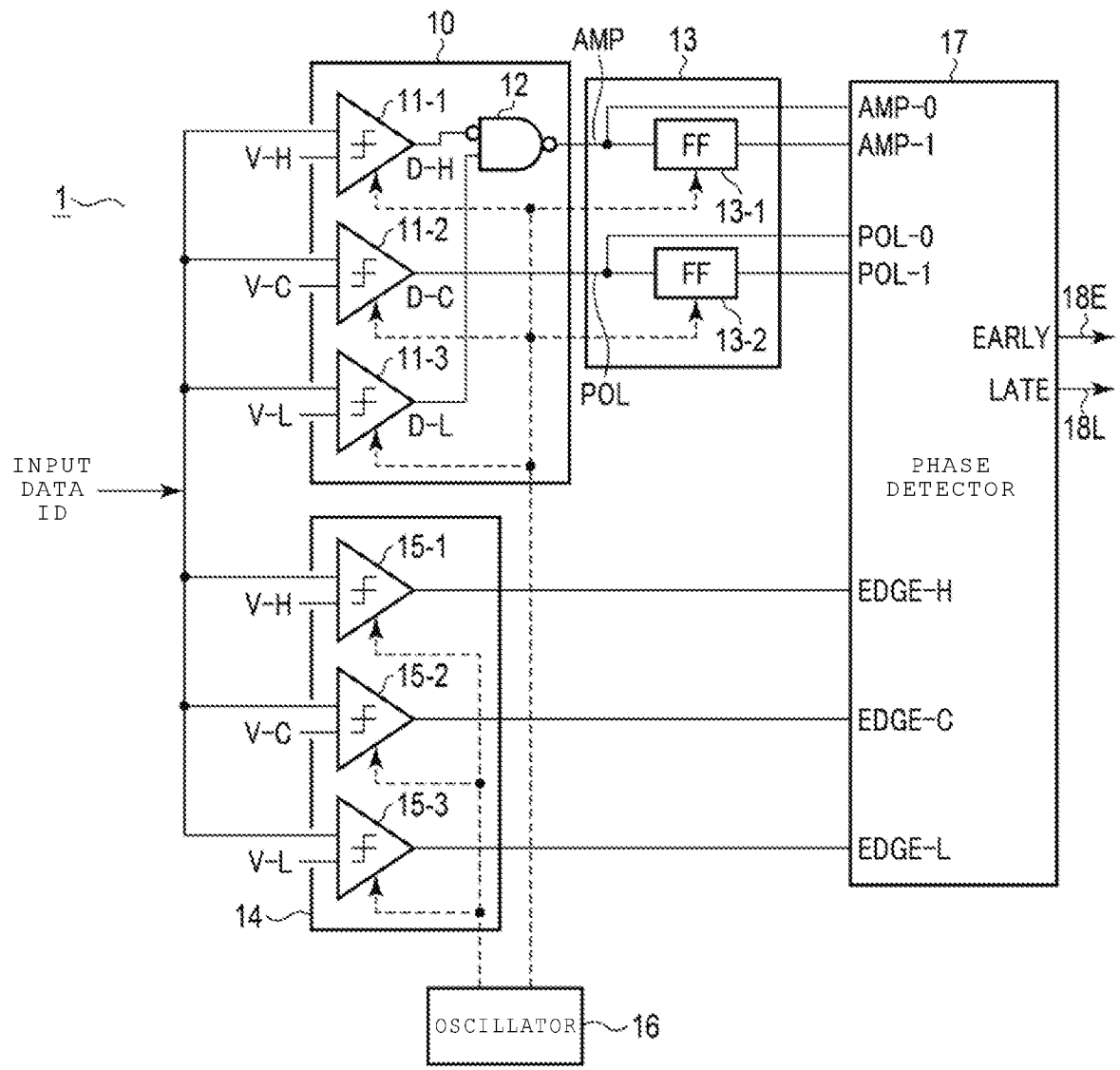
FIG. 1 is a block diagram for explaining a configuration of a CDR device according to a first embodiment.
FIG. 2 is a diagram illustrating an output state of a data sampler according to the first embodiment.

FIG. 1 is a block diagram for explaining a configuration of a CDR device 1 according to a first embodiment. The CDR device 1 of the first embodiment is provided in a reception circuit or the like for receiving a data signal (hereinafter, referred to as input data ID) serially transmitted in a memory system or the like, for example, and separates and recovers data and a clock. The CDR device 1 of the first embodiment is a CDR device of a type using a phase detector in order to execute synchronization processing of PAM-4 data which is the input data ID. As will be described later, the first embodiment relates to a configuration of a phase detector 17 and its peripheral circuits provided in the CDR device 1, and description of other configurations will be omitted.

As illustrated in FIG. 1, the CDR device 1 of the first embodiment includes a data sampler 10 including an amplitude conversion circuit 12, a flip-flop group 13, an edge sampler 14, an oscillator 16, and the phase detector (PD) 17. Here, input data ID is 2-bit (4-ary value) PAM-4 data of a pulse amplitude modulation type.

Figure 4:
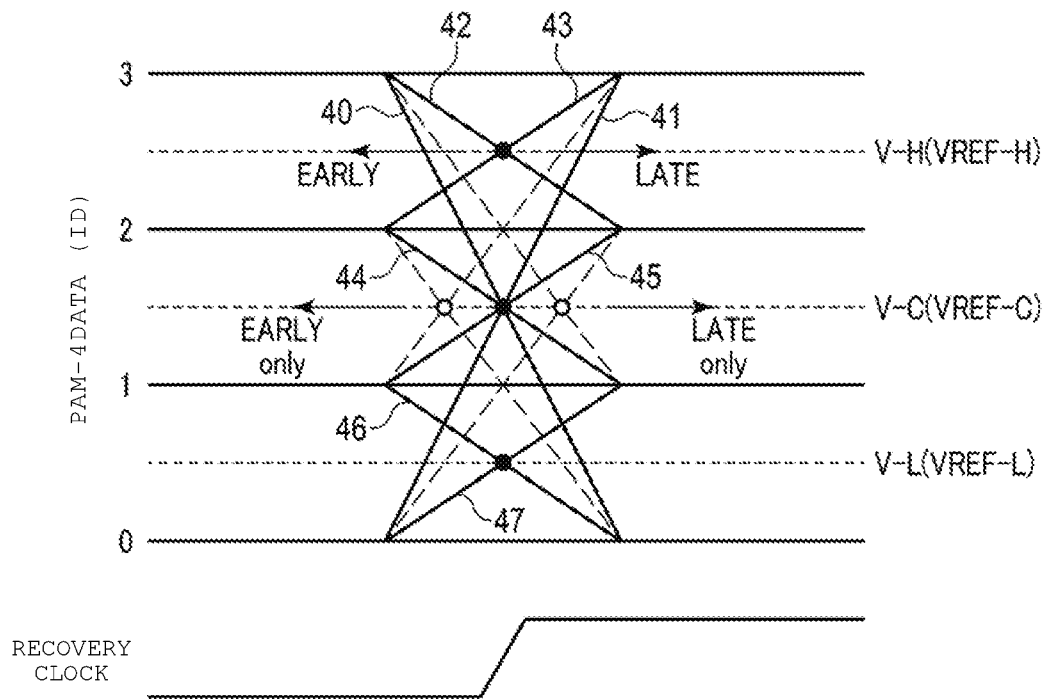
FIG. 4 is a diagram for explaining an example of an operation of the CDR device according to the first embodiment.

The data sampler 10 is a circuit that samples quaternary 4-ary value data 0 to data 3 from input data ID, and includes three comparators 11-1, 11-2, and 11-3, and the amplitude conversion circuit 12. The amplitude conversion circuit 12 includes a NAND gate whose first input terminal is an inverter. Each of the comparators 11-1, 11-2, and 11-3 outputs data information D-H, D-C, and D-L which are determination results in synchronization with the clock from the oscillator 16. Specifically, as illustrated in FIG. 4, the data sampler 10 determines a level of the input data ID based on a plurality of threshold levels (high level V-H (VREF-H), intermediate level V-C (VREF-C), and low level V-L (VREF-L)) and outputs data information D-H, for example, in a case where the level of the input data ID is larger than V-H (VREF-H). Here, in FIG. 4, an example of a recovery clock recovered by the CDR device 1 is illustrated, and the clock from the oscillator 16 is not illustrated. As will be described later, a phase of the clock from the oscillator 16 is adjusted based on phase information 18E and 18L output from the phase detector 17. As will be described later, the amplitude conversion circuit 12 and the flip-flop group 13 generate amplitude information AMP, AMP-0, and AMP-1 and polarity information POL, POL-0, and POL-1 based on data information D-H, D-C, and D-L.

The amplitude conversion circuit 12 and the flip-flop group 13 generate amplitude information AMP and polarity information POL based on data information D-H, D-C, and D-L sampled by the data sampler 10, and outputs the AMP and POL to the phase detector 17. The flip-flop group 13 includes flip-flops 13-1 and 13-2. Here, the amplitude conversion circuit 12 outputs amplitude information AMP-0 as amplitude information AMP. The flip-flop 13-1 receives the output of the amplitude conversion circuit 12 and outputs amplitude information AMP-1 as amplitude information AMP. On the other hand, the comparator 11-2 outputs polarity information POL-0 as polarity information POL based on logic 0 or 1 of data information D-C. The flip-flop 13-2 receives the output of the comparator 11-2 and outputs polarity information POL-1 as polarity information POL.

The edge sampler 14 is a circuit that samples an edge of 4-ary value data from the input data ID and includes three comparators 15-1, 15-2, and 15-3. Each of the comparators 15-1, 15-2, and 15-3 determines the level of the input data ID based on a plurality of threshold levels in synchronization with the clock from the oscillator 16, and outputs edge information EDGE-H, EDGE-C, and EDGE-L which are determination results.

The phase detector 17 receives amplitude information AMP-0 and AMP-1 output from the flip-flop 13-1, polarity information POL-0 and POL-1, and edge information EDGE-H, EDGE-C, and EDGE-L between consecutive data information output from the edge sampler, outputs phase information 18E and 18L for adjusting the phase of the clock from the oscillator 16, and feeds the phase information 18E and 18L back to the oscillator 16. Here, edge information is included in transition information corresponding to transition of a data value of input data ID. The phase information 18E is EARLY information indicating that a phase of a clock from the oscillator 16 is advanced. The phase information 18L is LATE information indicating that the phase of the clock is delayed.

FIG. 2 is a diagram illustrating an output state of the data sampler 10. The outputs illustrated in FIG. 2 correspond to 4-ary values 0 to 3 of PAM-4 data ID illustrated in FIG. 4 to be described later. Here, as illustrated in FIG. 1, amplitude information AMP is calculated by the amplitude conversion circuit 12 based on data information D-H and D-L. The polarity information POL corresponds to data information D-C which is a determination result of the comparator 11-2. That is, as illustrated in FIG. 2, the polarity information POL is equal to the data information D-C. That is, if the data information D-C is logic "0", the polarity information POL becomes logic "0". If the data information D-C is logic "1", the polarity information POL becomes logic "1". If logic of the data information D-H and D-L is equal, the amplitude information AMP becomes logic "1". If data information D-H and D-L is logic "01", the amplitude information AMP becomes logic "0".

Figure 3:
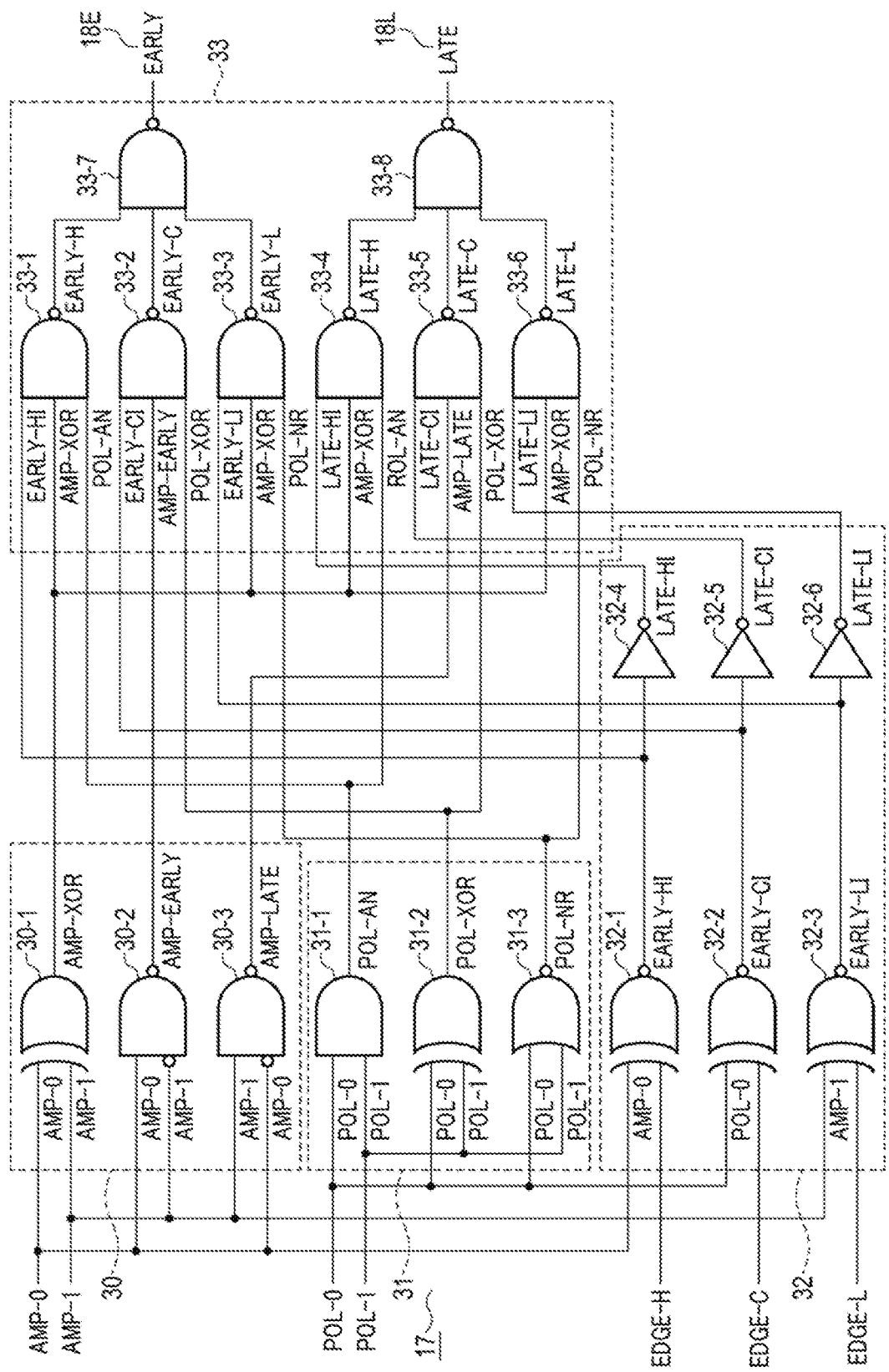
FIG. 3 is a circuit diagram illustrating an example of a partial configuration of a phase detector according to the first embodiment.

FIG. 3 is a circuit diagram of a logic gate level illustrating an example of the configuration of the phase detector 17. As illustrated in FIG. 3, the phase detector 17 includes an input gate circuit 30 of amplitude information AMP-0 and AMP-1, an input gate circuit 31 of polarity information POL-0 and POL-1, an input gate circuit 32 for edge information EDG-H, EDG-C, and EDG-L, and an output gate circuit 33 of phase information 18E and 18L.

The input gate circuit 30 includes an EX-OR (exclusive OR (XOR)) gate 30-1 and NAND gates 30-2 and 30-3 whose second input terminals are inverters. The input gate circuit 31 includes an AND gate 31-1, an EX-OR gate 31-2, and a NOR gate 31-3. The input gate circuit 32 includes EX-NOR gates 32-1 to 32-3 and inverters 32-4 to 32-6. The output gate circuit 33 includes NAND gates 33-1 to 33-8.

For example, in a case where amplitude information AMP-0 and AMP-1 is logic "00", polarity information POL-0 and POL-1 is logic "01", and edge information is logic "001", in the input gate circuit 30, the NAND gates 30-2 and 30-3 become logic "1" except for the EX-OR gate 30-1. In the input gate circuit 31, only the EX-OR gate 31-2 becomes logic "1". With this, logic "1" is determined for the NAND gates 33-1, 33-3, 33-4, and 33-6 of the output gate circuit 33. The inputs to the remaining NAND gates 33-2 and 33-5 are the inverter 32-2 and the EX-OR gate 32-5 which are inputs of EDGE-C of the input gate circuit 32, each logic becomes "10" and the logic of the NAND gates 33-2 and 33-5 becomes "0" and 1", respectively, so that the output EARLY of the NAND gate 33-7 becomes logic "1".

FIG. 4 is a diagram for explaining an example of an operation of the CDR device 1 of the first embodiment. Hereinafter, an example of the operation of the CDR device 1 of the first embodiment will be described with reference to FIG. 4.

The CDR device 1 of the first embodiment separates and outputs PAM-4 data, which is input data ID, and the clock. The CDR device 1 detects an edge (data signal transition) of the PAM-4 data ID and recovers a clock superimposed on input data ID by adjusting a phase of the clock of the oscillator 16.

As illustrated in FIG. 4, the PAM-4 data ID has a large amount of data and has 16 types of data signal transitions (edges). Among the 16 types of data signal transitions, there are 12 types of data signal transitions in which data changes. That is, 12 types of data signal transitions consist of eight first transition groups (solid lines) including data signal transitions 40 and 41 between levels 3 and 0, data signal transitions 42 and 43 between levels 3 and 2, data signal transitions 44 and 45 between levels 2 and 1, and data signal transitions 46 and 47 between levels 1 and 0, and four second transition groups (dotted lines). The second transition groups include data signal transitions between levels 3 and 1 and data signal transitions between levels 2 and 0.

The phase detector 17 of the first embodiment outputs phase information 18E (EARLY) when a phase of the recovered clock precedes the first transition group, and outputs phase information 18L (LATE) when the phase is delayed. For the second transition group, only when the phase is greatly shifted with respect to the first transition group, the phase detector 17 outputs the phase information 18E (EARLY only) or the phase information 18L (LATE only) by using only edge information according to the shifted direction. With this, as compared with a case where phase information of a recovered clock is simply set to EARLY or LATE with respect to the second transition group, it is possible to prevent erroneous phase information from being output under the condition that the phase error is sufficiently small and to reduce the jitter of the recovered clock.

A data transition probability indicates a ratio (corresponding to a phase comparison frequency of the PLL) that can be used as phase information with respect to a data rate. When it is assumed that data transition is random, the data transition probability of the first transition group is 50% and the data transition probability of the second transition group is 25%.

According to the first embodiment, only the phase information (transition probability 50%) for the first transition group is used when the phase error is sufficiently small and the phase information including the second group (transition probability 25%) is used when the phase error is large so as to output phase information 18E or 18L for adjusting the phase of the recovered clock of the oscillator 16. With this, in a state where the phase error is large, such as at the start of synchronization, it is possible to synchronize with data at high speed by using 75% of the edge information (by using the first transition group and the second transition group together). In a state where the phase error after synchronization is small, it is possible to reduce the influence of jitter increase to the recovered clock by data dependent jitter (DDJ) of PAM-4 by using only edge information having high synchronicity (e.g., the first transition group) without using unnecessary edge information.

In data signal transition of the first transition group, since the phases of the transition points (black circle) overlap, the phase positions are aligned. That is, in the synchronization state where the phase error is small, the data transition probability is 50%. In contrast, at the start of phase error detection, the data signal transition of the second transition group corresponds to a random signal whose phase of the transition point (white circle) is shifted, and the data transition probability is 25%.

As described above, in the first transition group, the phases of the transition points overlap with each other and results in a synchronization state in which the phase error is small and thus, the phase positions are aligned. In this case, the phase detector 17 detects the phase error by using edge information EDGE-H, EDGE-C, and EDGE-L of the first transition group and outputs phase information 18E and 18L for adjusting the phase of the clock of the oscillator 16.

On the other hand, as illustrated in FIG. 4, the second transition group includes data signal transitions between levels 3 and 1 and data signal transitions between levels 2 and 0. In the synchronization state where the phase error is small, since the phase error is sufficiently small, the output at the time of detecting the phase error according to the second transition group is 0. In this case, the phase of the transition point (white circle) may be greatly shifted with respect to the transition point (black circle) (phase error increases). Only when the phase of the transition point (white circle) is greatly shifted, the phase detector 17 of the first embodiment uses only the edge information of the second transition group according to the shifted direction and outputs the phase information 18E or the phase information 18L.

As described above, according to the first embodiment, a CDR device of a type using a phase detector can be provided in order to achieve low power consumption. Here, in a case where PAM-4 data is used as input data ID, the edge position (phase detection point) depends on a pattern of data signal transitions. For that reason, if the phase error is detected at all data signal transition points using all edge information, the data dependent jitter (DDJ) of the recovery clock recovered by the CDR device may increase due to the phase error component included in data.

Accordingly, in the first embodiment, at the time of activation of the phase error detection, the phase detector outputs phase information 18E (EARLY only) or phase information 18L (LATE only) only when the phase of the transition point is greatly shifted, by using edge information of the second transition group where the data transition probability is 75%. With this, high-speed synchronization operation becomes possible at the time of activation of phase error detection. In the synchronization state where the phase error is small, the phase detector 17 outputs the phase information 18E or 18L by using edge information of the first transition group where the data transition probability is 50%. That is, in the synchronization state where the phase error is small, the phase detector 17 uses only edge information having high synchronicity.

Accordingly, in the first embodiment, in a case where PAM-4 data is used as the input data ID, the phase detector 17 selects and uses specific edge information from a plurality of pieces of edge information and thus, it is possible to avoid such a situation that the jitter of the recovery clock recovered by the CDR device 1 is increased. With this, it is possible to achieve a CDR device of a type using a phase detector, that executes a stable operation.

FIG. 3 is an example of a logic gate circuit provided in the phase detector 17 of the first embodiment and outputting phase information 18E and 18L. That is, the logic gate circuit has a configuration in which the input data ID is decomposed into amplitude information and polarity information and the phase information 18E and 18L are output by allowing symmetry to be given to data with a threshold level (V-C (VREF-C)) as the center. The first embodiment is not limited to the configuration of the logic gate circuit, but may be a logic gate circuit having other configuration as long as operational effect of the phase detector 17 of the first embodiment described above can be obtained.

Second Embodiment

Figure 5:
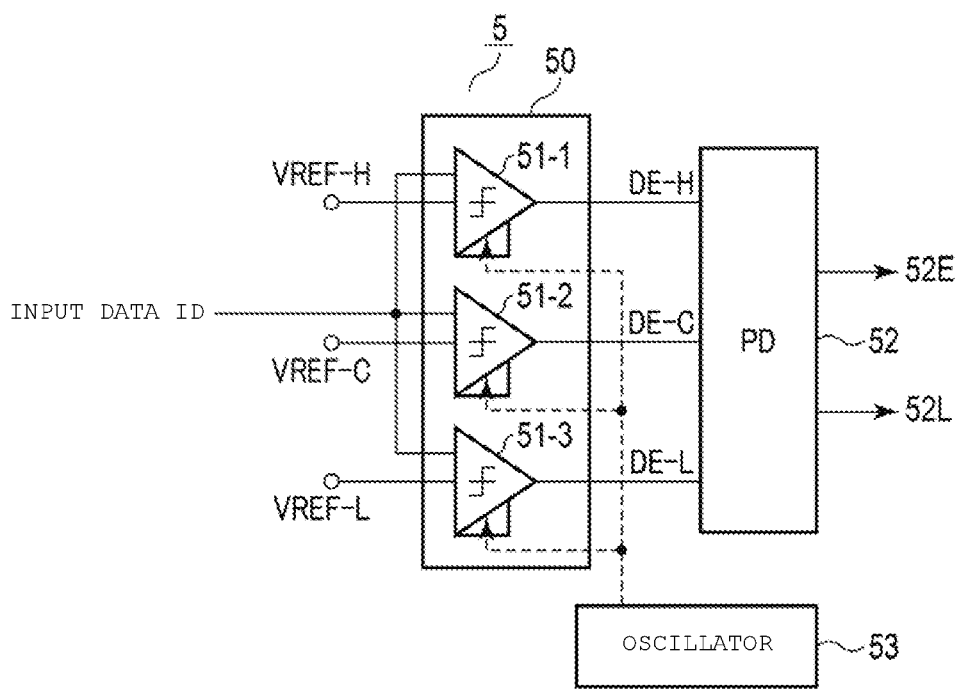
FIG. 5 is a block diagram for explaining a configuration of a CDR device according to a second embodiment.

FIG. 5 is a block diagram for explaining a configuration of a CDR device 5 according to a second embodiment. Similarly to the CDR device 1 of the first embodiment, the CDR device 5 of the second embodiment is a CDR device of a type using a phase detector in order to execute synchronization processing of PAM-4 data which is input data ID. Also, the second embodiment relates to a configuration of a phase detector 52 provided in the CDR device 5 and its peripheral circuit, and description of the other configurations will be omitted.

As illustrated in FIG. 5, the CDR device 5 of the second embodiment includes a data/edge sampler 50, a phase detector (PD) 52, and an oscillator 53. Similarly as in the first embodiment, input data ID is 2-bit (4-ary value) PAM-4 data of a pulse amplitude modulation type.

Here, the data/edge sampler 50 has a configuration in which a data sampler and an edge sampler are integrated, includes three comparators 51-1, 51-2, and 51-3, and extracts data/edge information. The comparators 51-1, 51-2, and 51-3 determine the level of input data ID, based on a plurality of threshold levels (high level VREF-H, intermediate level VREF-C, and low level VREF-L), in synchronization with a clock from the oscillator 53, respectively, and output data/edge information DE-H, DE-C, and DE-L as the determination results. The data/edge information is a 3-bit value including at least data information (data 1), edge information, and data information (data 2).

The phase detector 52 receives data/edge information DE-H, DE-C, and DE-L output from the data/edge sampler 50 as the input, outputs phase information 52E and 52L for adjusting a phase of a clock from the oscillator 53, and feeds the result back to the oscillator 53. The phase information 52E is EARLY information indicating that the phase of the clock of the oscillator 53 is advanced. The phase information 52L is LATE information indicating that the phase of the clock is delayed.

FIG. 6 is a diagram illustrating timings between input data (PAM-4 data) ID and the clock in the operation of the data/edge sampler 50. As illustrated in FIG. 6, the data/edge sampler 50 extracts data information (data 1 and data 2) of PAM-4 data ID at the rising timings t1 and t3 of the clock. The data/edge sampler 50 extracts edge information (edge) relating to data signal transition at the falling timing t2 of the clock. In the second embodiment, the edge of the clock for extracting data is not limited, and other circuit configurations may be adopted as long as it is possible to extract two consecutive data information and edge information between two consecutive data information.

FIG. 7 is a diagram for explaining characteristics of data signal transition of PAM-4 data with respect to an operational effect of the phase detector 52. As illustrated in FIG. 7, among plurality of data signal transitions of PAM-4 data, the phase of the transition point shifts in the data signal transitions 71 to 74 with respect to a phase position (center of change) 70 to be adjusted. Data signal transitions 71 to 74 are data signal transitions between levels 3 and 1 and data signal transitions between levels 2 and 0.

As illustrated in FIG. 7, in the data signal transitions 71 to 74, since the timing at which the signal crosses the threshold levels VREF-H, VREF-C, and VREF-L of the comparators 51-1, 51-2, and 51-3 is not present at the phase position 70 to be adjusted, it is difficult to perform a phase comparison determination process. The phase detector 52 according to the second embodiment independently executes a determination of the phase error EARLY or LATE with respect to each of the three comparators 51-1, 51-2, and 51-3, and outputs a determination result, which is EARLY information or LATE information, including a determination to be indeterminable.

Hereinafter, operations and operational effects of the phase detector 52 of the second embodiment will be described with reference to FIGS. 8 to 14.

The phase detector 52 according to the second embodiment independently determines the phase error EARLY or LATE with respect to each of the three comparators 51-1, 51-2, and 51-3, calculates a total value EARLY_sum or LATE_sum, and outputs a determination result, which is EARLY information or LATE information, including a determination to be indeterminable. Specifically, in a case where logic is inverted between data information (data 1) and edge information in the determination result, the phase detector 52 determines that the phase error is LATE. On the other hand, in a case where when the logic is inverted between data information (data 2) and edge information, the phase detector 52 determines that it is EARLY.

FIG. 8 is a diagram illustrating the determination result of the phase error EARLY or LATE output from the phase detector 52 based on a comparison result between the EARLY_sum and the LATE_sum. As illustrated in FIG. 8, in the case of the comparison result in which the LATE_sum coincides with the EARLY_sum, the determination result is indefinite and thus, the phase detector 52 outputs EARLY information and LATE information both of which are L. In the case where the LATE_sum is larger than the EARLY_sum, the phase detector 52 outputs the phase information 52L indicating LATE information as H and phase information 52E as L. On the other hand, in the case where the EARLY_sum is larger than the LATE_sum, the phase detector 52 outputs the phase information 52E indicating the EARLY information as H and the phase information 52L as L.

Here, the LATE_sum is calculated from a calculation expression of "data information D-H (data 1) XOR edge information D-H (edge)+data information D-C (data 1) XOR edge information D-C (edge)+data information D-L (data 1) XOR edge information D-C (edge)". The EARLY_sum is calculated from a calculation expression of "data information D-H (data 2) XOR edge information D-H (edge)+data information D-C (data 2) XOR edge information D-C (edge)+data information D-L (data 2) XOR edge information D-C (edge)". The symbol "XOR" means EX-OR (exclusive OR) operation processing.

Figure 9:
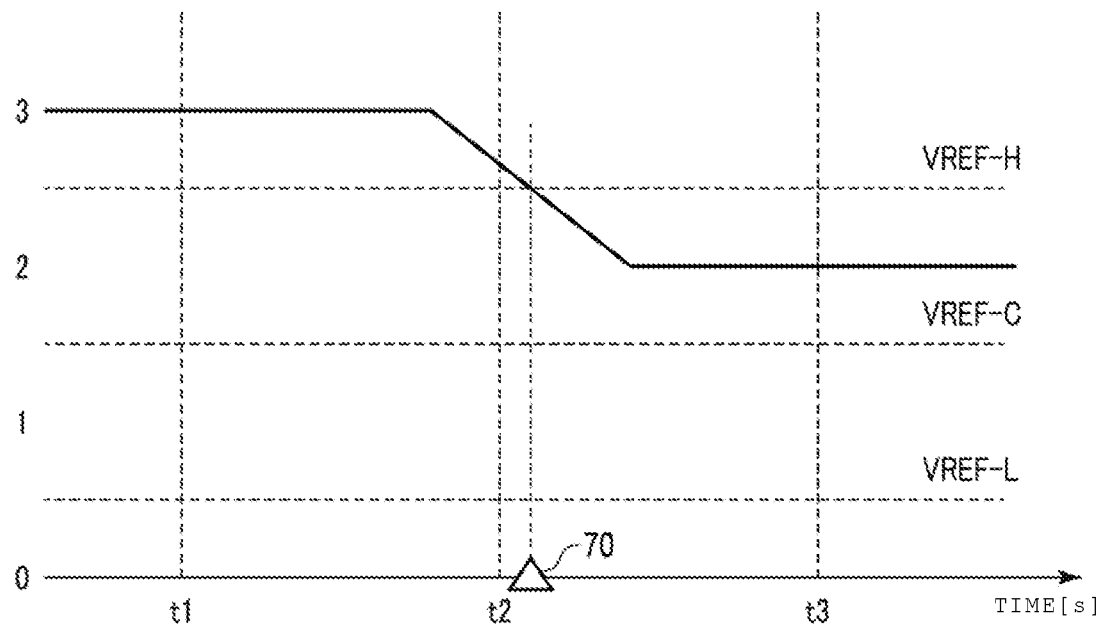
FIG. 9 is a diagram illustrating an example of data signal transition according to the second embodiment.
Figure 10:
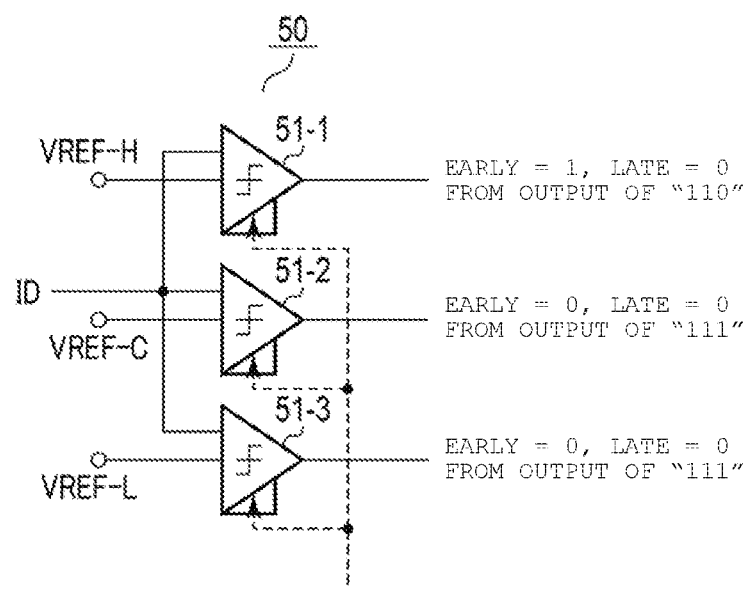
FIG. 10 is a diagram for explaining an example of operations of the data/edge sampler and the phase detector according to the second embodiment.
Figure 11:
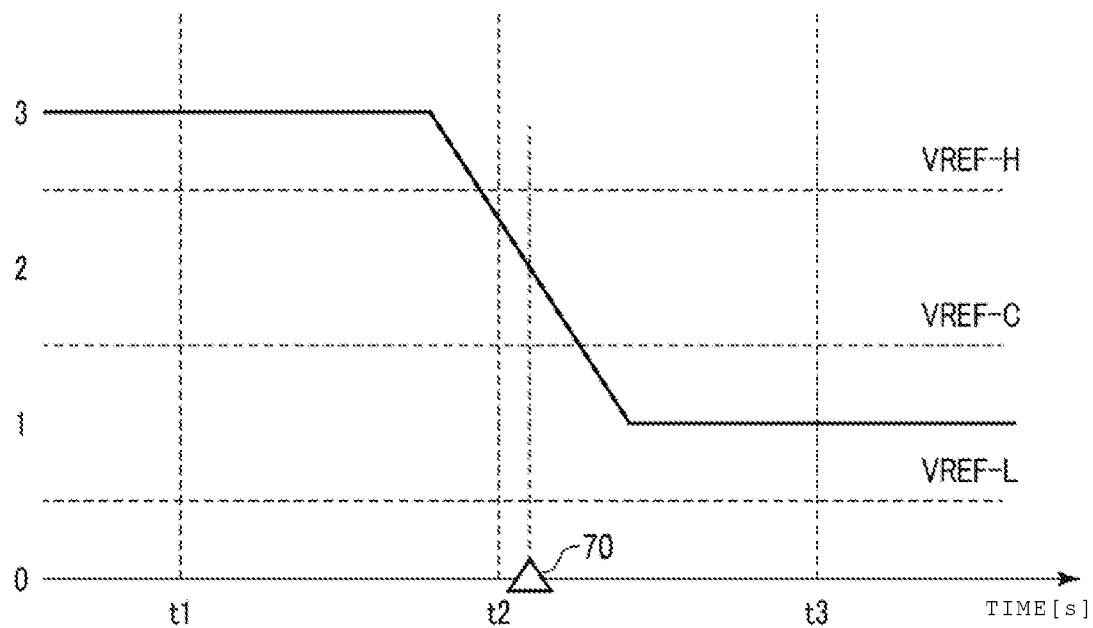
FIG. 11 is a diagram illustrating another example of the data signal transition according to the second embodiment.
Figure 12:
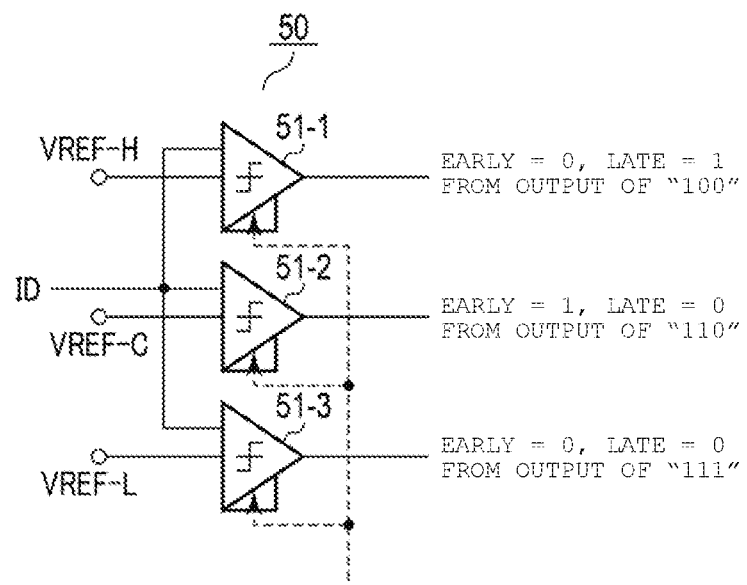
FIG. 12 is a diagram for explaining another example of operations of the data/edge sampler and the phase detector according to the second embodiment.
Figure 13:
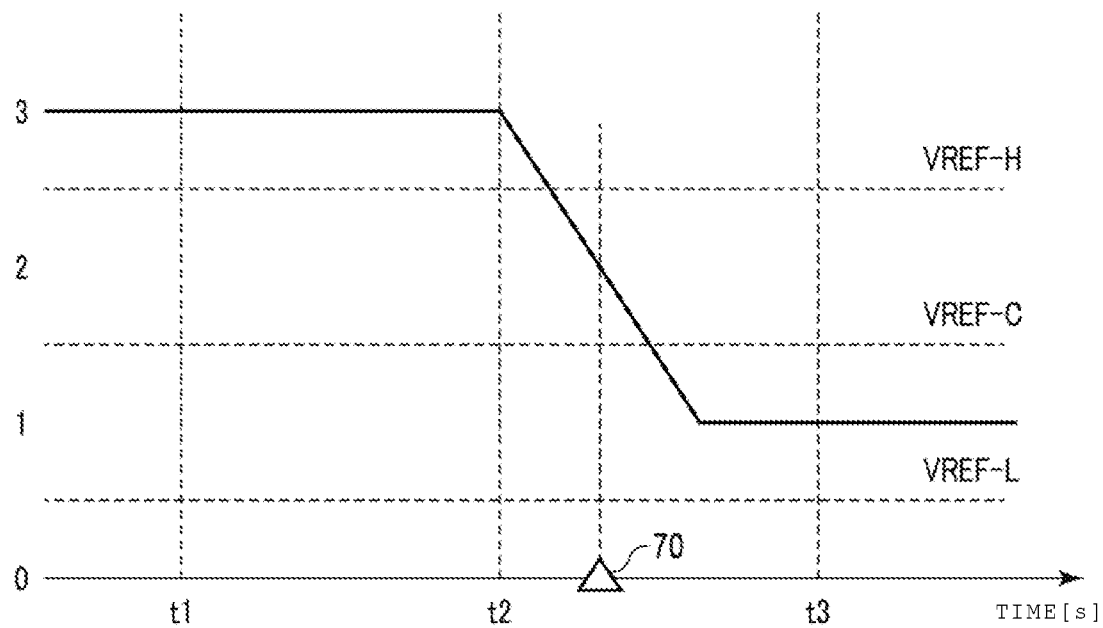
FIG. 13 is a diagram illustrating another example of the data signal transition according to the second embodiment.
Figure 14:
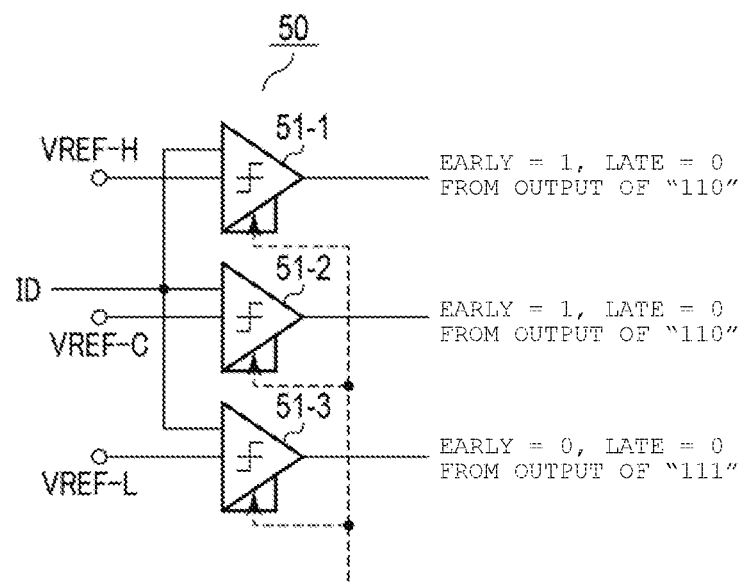
FIG. 14 is a diagram for explaining another example of operations of the data/edge sampler and the phase detector according to the second embodiment.

FIGS. 9 to 13 are diagrams for explaining specific operations of the data/edge sampler 50 and the phase detector 52. FIG. 9, FIG. 11, and FIG. 13 are diagrams illustrating examples of data signal transitions of input data (PAM-4 data) ID, respectively. FIG. 10, FIG. 12, and FIG. 14 are diagrams for explaining examples of operations of the data/edge sampler 50 and the phase detector 52, respectively.

FIG. 9 is an example in which data signal transition of input data (PAM-4 data) ID is data signal transition between level 3 and level 2. In this example, a threshold level VREF-H is obtained at the phase position 70 to be adjusted and thus, as illustrated in FIG. 10, the comparator 51-1 having the threshold value VREF-H outputs "110" as data/edge information DE-H, in the data/edge sampler 50. Since it is a case where the logic of the input data/edge information DE-H is inverted between the edge information and the data information DE-H (data 2 at the timing t3), the phase detector 52 determines that "EARLY=1" and "LATE=0". Also, the comparators 51-2 and 51-3 output "111" as the data/edge information DE-C and DE-L, respectively. In this case, the phase detector 52 determines that "EARLY=0" and "LATE=0", in both cases.

The phase detector 52 calculates "LATE_sum=0(L)" and "EARLY_sum=1(H)" from the calculation expressions of the LATE_sum and the EARLY_sum described above. Accordingly, the phase detector 52 outputs phase information 52E indicating the EARLY information as the phase determination result and feeds the phase information 52E back to the oscillator 53. The oscillator 53 adjusts the phase of the clock according to the EARLY information.

FIG. 11 is an example in which data signal transition of input data (PAM-4 data) ID is data signal transition between level 3 and level 1. In this example, since the phase level does not become the threshold level at the phase position 70 to be adjusted, the phase comparison determination of the data signal transition becomes indefinite, so that the phase detector 52 does not output the phase determination result EARLY information or LATE information.

As illustrated in FIG. 12, in the data/edge sampler 50, the comparator 51-1 outputs "100" as the data/edge information DE-H. Since logic of the input data/edge information DE-H is inverted between the edge information and the data information DE-H (data 1 at the timing t1), the phase detector 52 determines that "EARLY=0" and "LATE=1". The comparators 51-2 and 51-3 output "110" and "111" as the data/edge information DE-C and DE-L, respectively. In this case, the phase detector 52 determines that "EARLY=1" and "LATE=0" for the data/edge information DE-C and determines that "EARLY=0" and "LATE=0" for the data/edge information DE-L.

The phase detector 52 calculates "LATE_sum=1(H)" and "EARLY_sum=1 (H)" from the respective calculation expressions of LATE_sum and EARLY_sum described above. Accordingly, in a case where the LATE_sum coincides with the EARLY_sum, the determination result is indefinite and thus, the phase detector does not output the phase determination result EARLY information or LATE information.

Next, FIG. 13 is an example in which data signal transition of input data (PAM-4 data) ID is data signal transition between level 3 and level 1. Also, in this example, similarly as in the example of FIG. 11, since the phase level does not become the threshold level at the phase position 70 to be adjusted, there is a possibility that the phase comparison determination of the data signal transition becomes indefinite. However, as compared with the case of FIG. 11, since the phase error is relatively large in the data signal transitions crossing the two threshold levels VREF-H and VREF-C, the phase detector 52 can output the phase determination result (EARLY information/LATE information).

As illustrated in FIG. 14, the comparator 51-1 outputs "110" as the data/edge information DE-H based on the threshold level VREF-H, in the data/edge sampler 50. Since logic of the input data/edge information DE-H is inverted between the edge information and the data information DE-H (data 2 at the timing t3), the phase detector 52 determines that "EARLY=1" and "LATE=0".

The comparators 51-2 and 51-3 output "110" and "111" as the data/edge information DE-C and DE-L, respectively. In this case, the phase detector 52 determines that "EARLY=1" and "LATE=0" for the data/edge information DE-C and determines that "EARLY=0" and "LATE=0" for the data/edge information DE-L.

The phase detector 52 calculates "LATE_sum=0(L)" and "EARLY_sum=2(H)" and outputs the phase information 52E indicating the EARLY information as the phase determination result. Here, since it is that "EARLY_sum=2", the phase detector 52 may output "VERY EARLY", which indicates that the phase error is relatively large, as the phase determination result.

Third Embodiment

Figure 15:
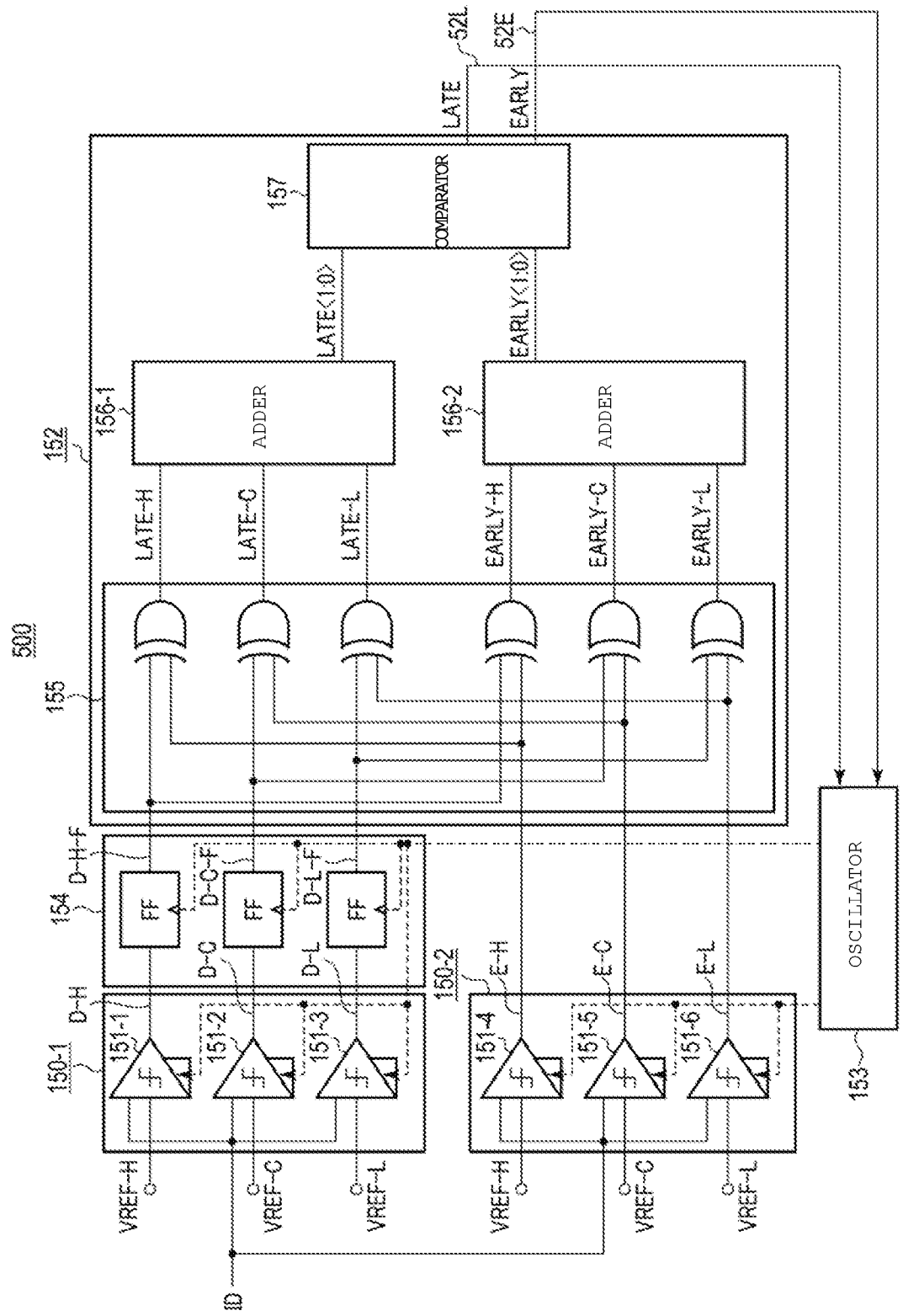
FIG. 15 is a block diagram illustrating a specific example of a CDR device according to a third embodiment.

FIG. 15 is a block diagram illustrating an example of the CDR device 500 of a third embodiment. The determination result of the phase error EARLY or LATE output from the phase detector 152 is the same as that illustrated in FIG. 8.

As illustrated in FIG. 15, the CDR device 500 of the third embodiment includes a data sampler 150-1 and an edge sampler 150-2. The samplers 150-1 and 150-2 include three comparators 151-1, 151-2, and 151-3 and 151-4, 151-5, and 151-6, respectively. The comparators 151-1, 151-2, 151-3, 151-4, 151-5, and 151-6 determine the level of the input data ID based on a plurality of threshold levels VREF-H, VREF-C, and VREF-L in synchronization with the clock from the oscillator 153 and output data information D-H, D-C, and D-L and edge information E-H, E-C, and E-L which are determination results, respectively. Furthermore, in the CDR device 500 of the third embodiment, the data sampler 150-1 includes a flip-flop circuit 154 for latching respective outputs (data information D-H, D-C, and D-L) of the comparators 151-1, 151-2, and 151-3. The flip-flop circuit 154 latches the outputs of the comparators 151-1, 151-2, and 151-3 in synchronization with the clock from the oscillator 153, and outputs the latched outputs to the phase detector 152.

The phase detector 152 includes an EX-OR gate circuit 155 that receives respective outputs (data information D-H-F, D-C-F, and D-L-F) from the flip-flop circuit 154 and respective outputs (edge information E-H, E-C, and E-L) from the edge sampler 150-2 as inputs and independently outputs each of the phase error LATE (LATE-H, LATE-C, and LATE-L) and each of the phase error EARLY (EARLY-H, EARLY-C, and EARLY-L). The EX-OR gate circuit 155 executes an EX-OR operation with each output from the flip-flop circuit 154 based on the plurality of threshold levels (VREF-H, VREF-C, and VREF-L) and each output from the edge sampler 150-2 based on the plurality of threshold levels (VREF-H, VREF-C, and VREF-L) and outputs the phase error LATE-H, LATE-C, and LATE-L of a phase delay and the phase error EARLY-H, EARLY-C, and EARLY-L of a phase advance using the logic level "1" and "0". For example, in the case of an example as illustrated in FIG. 9, the EX-OR gate circuit 155 outputs a logic level "1" as the phase error EARLY-H of the phase advance based on the threshold level VREF-H. In this case, the EX-OR gate circuit 155 outputs a logic level "0" as other phase errors LATE-H, LATE-C, and LATE-L and phase errors EARLY-C and EARLY-L.

The phase detector 152 includes an adder 156-1 for adding the phase error LATE (LATE-H, LATE-0, and LATE-L) output from the EX-OR gate circuit 155 and an adder 156-2 for adding the phase error EARLY (EARLY-H, EARLY-0, and EARLY-L). That is, the EX-OR gate circuit 155 and the adders 156-1 and 156-2 are arithmetic circuits for calculating the LATE_sum and the EARLY_sum described in the second embodiment.

The phase detector 152 includes a comparator 157 which outputs EARLY information 52E or LATE information 52L, which is a result of phase determination, based on LATE_sum (1:0) and EARLY_sum (1:0). The EARLY information 52E or the LATE information 52L is fed back to the oscillator 153. The phase determination result of the third embodiment is the same as that of the case illustrated in FIG. 8.

By allowing the comparator 157 to be a 2-bit comparator, in a case where the phase error is large, an output being 2 or 3 times can be obtained and thus, it is possible to perform synchronization at high speed. The detailed operations of the CDR device 500 according to the third embodiment are similar to the operations described above with reference to FIGS. 8 to 14 and thus, the description thereof will be omitted.

According to the third embodiment, it is possible to provide a CDR device of a type using a phase detector PD in order to achieve low power consumption. Here, in a case where the PAM-4 data is used as the input data ID, the edge position (phase detection point) depends on the pattern of the data signal transitions. For that reason, there is a possibility that the threshold level for extracting data/edge information is not appropriate for the phase position (edge position) to be adjusted and the phase determination result of the phase error EARLY or LATE cannot be determined, in a certain data signal transition pattern.

Accordingly, in the third embodiment, the phase detector executes a phase detection operation that is divided into a case where the phase determination result of the phase error EARLY or LATE can be determined and a case where the phase determination result of the phase error EARLY or LATE cannot be determined (indeterminate) according to the data signal transition. That is, in the case of data signal transition in which the phase determination result can be determined, the phase detector of the third embodiment determines the phase error EARLY or LATE using the data/edge information extracted based on the threshold level.

On the other hand, in the case of indeterminate, the phase detector of the third embodiment does not perform a phase determination according to data signal transition. However, in data signal transition crossing two threshold levels, in a case where the phase error is relatively large, the phase detector executes the phase determination and outputs the determination result of the phase error EARLY or LATE. That is, in the data signal transition crossing two threshold levels, in a case where the phase error is relatively small and the phase determination result is indeterminate, the phase detector according to the third embodiment does not execute the phase determination.

Therefore, according to the third embodiment, in a case where PAM-4 data is used as the input data ID, it is possible to execute the phase determination only in the case where the phase determination result can be determined, without determining the phase error for all data signal transitions. With this, it is possible to avoid a situation in which the phase detector malfunctions in a case of executing the phase determination according to the data signal transition. For that reason, it is possible to achieve a CDR device of a type using a phase detector, that performs a stable operation.

In data signal transition crossing two threshold levels, in a case where the phase error is relatively large and the phase determination result is indeterminate, the phase detector executes the phase determination. With this, in a case of the indeterminate, it is possible to realize a CDR device of a type using a phase detector, that performs a stable operation as compared with a scheme that simply thins out the phase determination result.

In the first and second embodiments, the case where the PAM-4 data is used as the input data ID is described, but the first and second embodiments may also be applied to the case of using other multivalued (X-ary value) PAM-X data. The signal of the input data ID may be a differential (pair) signal instead of a single signal.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A clock and data recovery device comprising:
an extraction circuit configured to extract transition information including data information corresponding to a value of data and edge information corresponding to transition of the value of the data, from a multivalued input data signal subjected to pulse amplitude modulation in synchronization with an input clock; and
a phase detection circuit configured to use transition information selected based on a predetermined condition, when executing a phase error determination of the clock with respect to the input data signal based on the transition information extracted by the extraction circuit,
wherein the predetermined condition is a synchronization state where a phase error of data signal transition is relatively small, and the phase detection circuit is configured to use a first group of the transition information in the synchronization state.

2. The clock and data recovery device according to claim 1,
wherein the phase detection circuit is configured to generate phase information for adjusting a phase of the clock based on a determination result of the phase error determination and output the generated phase information to adjust the phase of the input clock.

3. The clock and data recovery device according to claim 1,
wherein in a synchronization state where a phase error of the data signal transition is relatively large, the phase detection circuit is further configured to use the first group of the transition information and a second group of the transition information.

4. The clock and data recovery device according to claim 1,
wherein the extraction circuit is configured to extract the transition information based on a plurality of threshold levels.

5. The clock and data recovery device according to claim 4,
wherein in a case where a phase error in data signal transition crossing one of the threshold levels is relatively small, the phase detection circuit is configured not to output the result of the phase error determination.

6. The clock and data recovery device according to claim 4,
wherein in a case where a phase error in data signal transition crossing one of the threshold levels is relatively large, the phase detection circuit is further configured to output the result of the phase error determination.

7. The clock and data recovery device according to claim 4, wherein
the phase detection circuit is further configured to determine whether the result of the phase error determination is determinate or indeterminate, based on each of extraction results of the extraction circuit corresponding to the plurality of threshold levels, and
in a case where the result of the phase error determination is indeterminate and the predetermined condition is satisfied, the phase detection circuit is further configured not to output the result of the phase error determination.

8. The clock and data recovery device according to claim 7,
wherein in a case where the result of the phase error determination is indeterminate and a phase error in data signal transition crossing one of the threshold levels is relatively large, the phase detection circuit is further configured to output the result of the phase error determination.

9. A phase detection method applied to a clock and data recovery device, the method comprising:
extracting transition information including data information corresponding to a value of data and edge information corresponding to transition of the value of the data, from a multivalued input data signal subjected to pulse amplitude modulation in synchronization with an input clock; and
executing a phase detection process that uses transition information selected based on a predetermined condition, when executing a phase error determination of the input clock with respect to the input data signal based on the extracted transition information,
wherein the predetermined condition is a synchronization state where a phase error of data signal transition is relatively small, and a first group of the transition information is used during the phase detection process in the synchronization state.

10. The phase detection method according to claim 9,
wherein in the phase detection process, phase information for adjusting a phase of the input clock is generated based on a determination result of the phase error determination and the generated phase information is output to adjust the phase of the input clock.

11. The phase detection method according to claim 9, wherein in a synchronization state where a phase error of the data signal transition is relatively large, the first group of the transition information and a second group of the transition information are used during the phase detection process.

12. The phase detection method according to claim 9, wherein the transition information is extracted based on a plurality of threshold levels.

13. The phase detection method according to claim 12, wherein, during the phase detection process, in a case where a phase error in data signal transition crossing one of the threshold levels is relatively small, the result of the phase error determination is not output during the phase detection process.

14. The phase detection method according to claim 12, wherein, during the phase detection process, in a case where a phase error in data signal transition crossing one of the threshold levels is relatively large, the result of the phase error determination is output.

15. The phase detection method according to claim 12, wherein during the phase detection process, whether the result of the phase error determination is determinate or indeterminate is determined, based on each of extraction results corresponding to the plurality of threshold levels, and during the phase detection process, in a case where the result of the phase error determination is indeterminate and the predetermined condition is satisfied, the result of the phase error determination is not output.

16. The phase detection method according to claim 15, wherein, during the phase detection process, in a case where the result of the phase error determination is indeterminate and a phase error in data signal transition crossing one of the threshold levels is relatively large, the result of the phase error determination is output.

* * * * *